(12) United States Patent
Lee et al.

(10) Patent No.: US 11,060,734 B2
(45) Date of Patent: Jul. 13, 2021

(54) COOKING APPLIANCE

(71) Applicant: LG ELECTRONICS INC., Seoul (KR)

(72) Inventors: Sangkyun Lee, Seoul (KR); Jihu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 16/385,136

(22) Filed: Apr. 16, 2019

(65) Prior Publication Data

US 2019/0316778 A1  Oct. 17, 2019

(30) Foreign Application Priority Data

Apr. 16, 2018 (KR) ........................ 10-2018-0044033

(51) Int. Cl.
*F24C 7/08* (2006.01)
*A21B 3/02* (2006.01)
*F24C 15/02* (2006.01)

(52) U.S. Cl.
CPC ................ *F24C 7/085* (2013.01); *A21B 3/02* (2013.01); *F24C 15/023* (2013.01); *E05Y 2900/308* (2013.01)

(58) Field of Classification Search
CPC . A21B 3/02; F24C 7/085; F24C 15/04; F24C 7/02; F24C 15/022; F24C 15/327; F24C 7/08; F24C 7/087; F24C 15/00; F24C 15/008; F24C 15/02; F24C 15/021; F24C 15/2042; F24C 15/2078; F24C 15/34; F24C 3/128; F24C 7/04; F24C 7/088; D06F 33/00; D06F 39/14; D06F 2101/00; D06F 2103/16; D06F 2103/18; D06F 2105/00; D06F 2105/44; D06F 21/04; D06F 2202/02; D06F 2202/085; D06F 2202/10; D06F 2202/12; D06F 2204/02; D06F 2212/02; D06F 23/04; D06F 22/32; D06F 34/18; D06F 34/28; D06F 37/12; D06F 37/18; D06F 37/20; D06F 37/30; D06F 37/42; D06F 39/02; D06F 39/022; D06F 39/024; D06F 39/028; D06F 39/08; D06F 39/087; D06F 58/203; D06F 58/30; F25D 23/028;

(Continued)

(56) References Cited

U.S. PATENT DOCUMENTS

| 2,327,200 | A | 8/1943 | William |
| 2007/0103887 | A1 | 5/2007 | Bleier et al. |
| 2007/0267401 | A1 | 11/2007 | Collene et al. |

FOREIGN PATENT DOCUMENTS

| EP | 2370735 | 2/2016 |
| JP | 2689680 | 12/1997 |

(Continued)

OTHER PUBLICATIONS

Extended European Search Report in European Application No. 19169385.2, dated Sep. 3, 2019, 9 pages.

(Continued)

*Primary Examiner* — Jason Lau
(74) *Attorney, Agent, or Firm* — Fish & Richardson P.C.

(57) ABSTRACT

A cooking appliance includes a body having a cooking chamber, a door connected to the body by a hinge mechanism to open or close the cooking chamber, and a sensor module inserted into or withdrawn from the body through a wall of the body and configured to come into contact with or be spaced apart from the hinge mechanism according to opening and closing of the door.

19 Claims, 7 Drawing Sheets

(58) Field of Classification Search
CPC .... F25D 2700/02; F25D 29/00; F25D 11/003; F25D 17/062; F25D 21/004; F25D 21/006; F25D 21/025; F25D 21/08; F25D 2201/14; F25D 2323/021; F25D 2323/024; F25D 23/00; F25D 23/10; F25D 2400/02; F25D 2400/36; F25D 2500/06; F25D 2600/06; F25D 2700/06; F25D 2700/08; F25D 2700/10; F25D 2700/12; F25D 27/005; F25D 29/005; F25D 3/08; H05B 47/19; H05B 47/105; H05B 45/20; H05B 47/16; H05B 45/00; H05B 45/10; H05B 45/37; H05B 47/11; H05B 6/6441; H05B 6/6447; H05B 6/687; H05B 47/10; H05B 6/6417; H05B 2206/04; H05B 6/6411; H05B 6/6414; H05B 6/76

See application file for complete search history.

(56) References Cited

FOREIGN PATENT DOCUMENTS

| KR | 10-2002-0044461 A | 6/2002 |
| KR | 10-0747814 B1 | 8/2007 |
| WO | WO2010076201 | 7/2010 |

OTHER PUBLICATIONS

Korean Notice of Allowance in Korean Appln. No. 10-2018-0044033, dated Apr. 20, 2020, 13 pages.

COOKING APPLIANCE

CROSS-REFERENCE TO RELATED APPLICATION

This application is based on and claims the benefit of priority to Korean Patent Application No. 10-2018-0044033, filed on Apr. 16, 2018, in the Korean Intellectual Property Office, the disclosure of which is incorporated herein in its entirety by reference.

BACKGROUND

1. Field

The present disclosure relates to a cooking appliance.

2. Description of the Related Art

A cooking appliance is an appliance for cooking foods using heat from a heat source.

The cooking appliance may include a body having a cooking chamber, at least one heat source provided in the body, and a door connected to the body to open and close the cooking chamber.

High-temperature heat is generated in a heat source to heat food contained in a cooking chamber. Therefore, the heating source needs to be prevented from operating in a state in which a door is opened for the safety of the user.

Korean Patent Registration No. 10-0747814, which is a prior art document, discloses an oven door opening/closing detection device.

The oven door opening/closing detection device includes a base plate, a rod installed on the base plate and moving back and forth by contact with the oven door, a micro switch capable of selectively contacting the rod's working portion, and an elastic member for providing an elastic force to the rod.

In a state in which the oven door is opened, the rod is protruded forward from the front plate of an oven cavity by the elastic member, and an operation button of the micro switch is pressed. In this state, a control circuit recognizes that the oven door is opened.

On the other hand, when the oven door is closed, the door pushes the rod protruding forward of the front plate so that the rod is moved backward, and the depression of the operation button of the micro-switch is released. In this state, the control circuit recognizes that the oven door is closed.

According to this prior art, since the rod protrudes to the outside of the oven cavity in the state where the oven door is opened, the sense of beauty decreases and it is apprehended that the projected rod is damaged.

In addition, since the micro-switch is located inside the base plate and the front plate of the oven cavity is disposed in front of the base plate, there are disadvantages that the micro-switch is necessarily detached from the oven after disassembling the oven when the micro-switch needs to be serviced or replaced.

SUMMARY

The present embodiment provides a cooking appliance in which a sensor module that senses opening and closing of a door is prevented from protruding outward.

The present embodiment provides a cooking appliance in which a sensor module that senses opening and closing of a door is prevented from protruding outward.

A cooking appliance includes a body having a cooking chamber, a door connected to the body by a hinge mechanism to open or close the cooking chamber, and a sensor module inserted into or withdrawn from the body through a wall of the body and configured to come into contact with or be spaced apart from the hinge mechanism according to opening and closing of the door.

DETAILED DESCRIPTIONS

Figure 1:
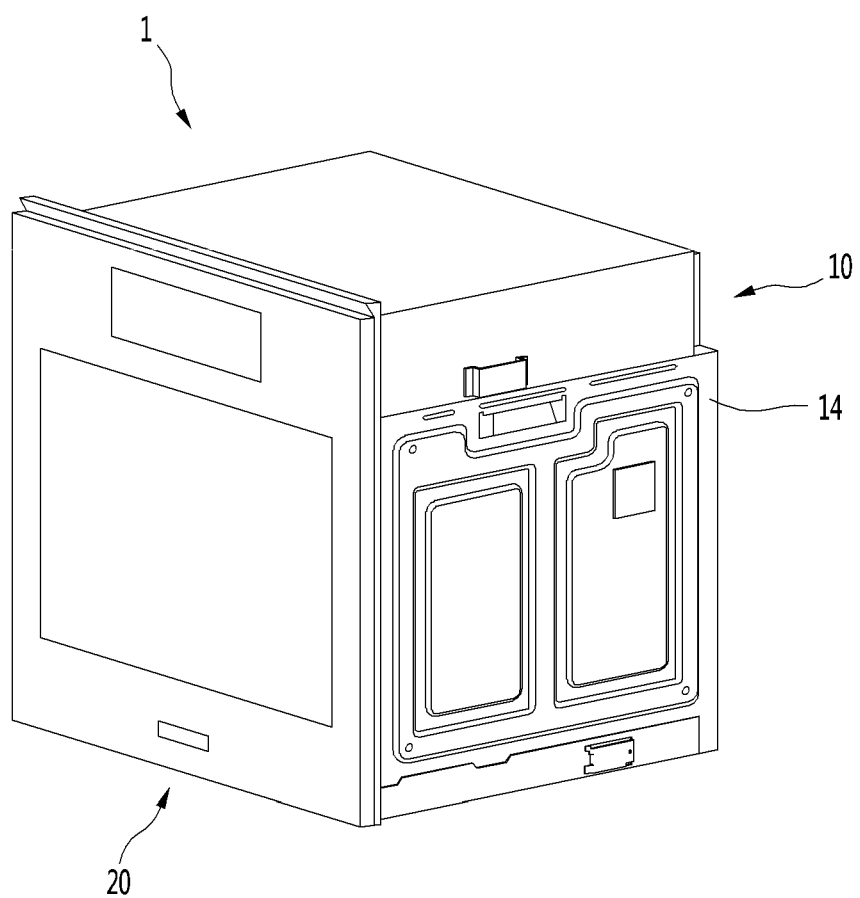
FIG. 1 is a perspective view of a cooking appliance according to an embodiment of the present invention.
Figure 2:
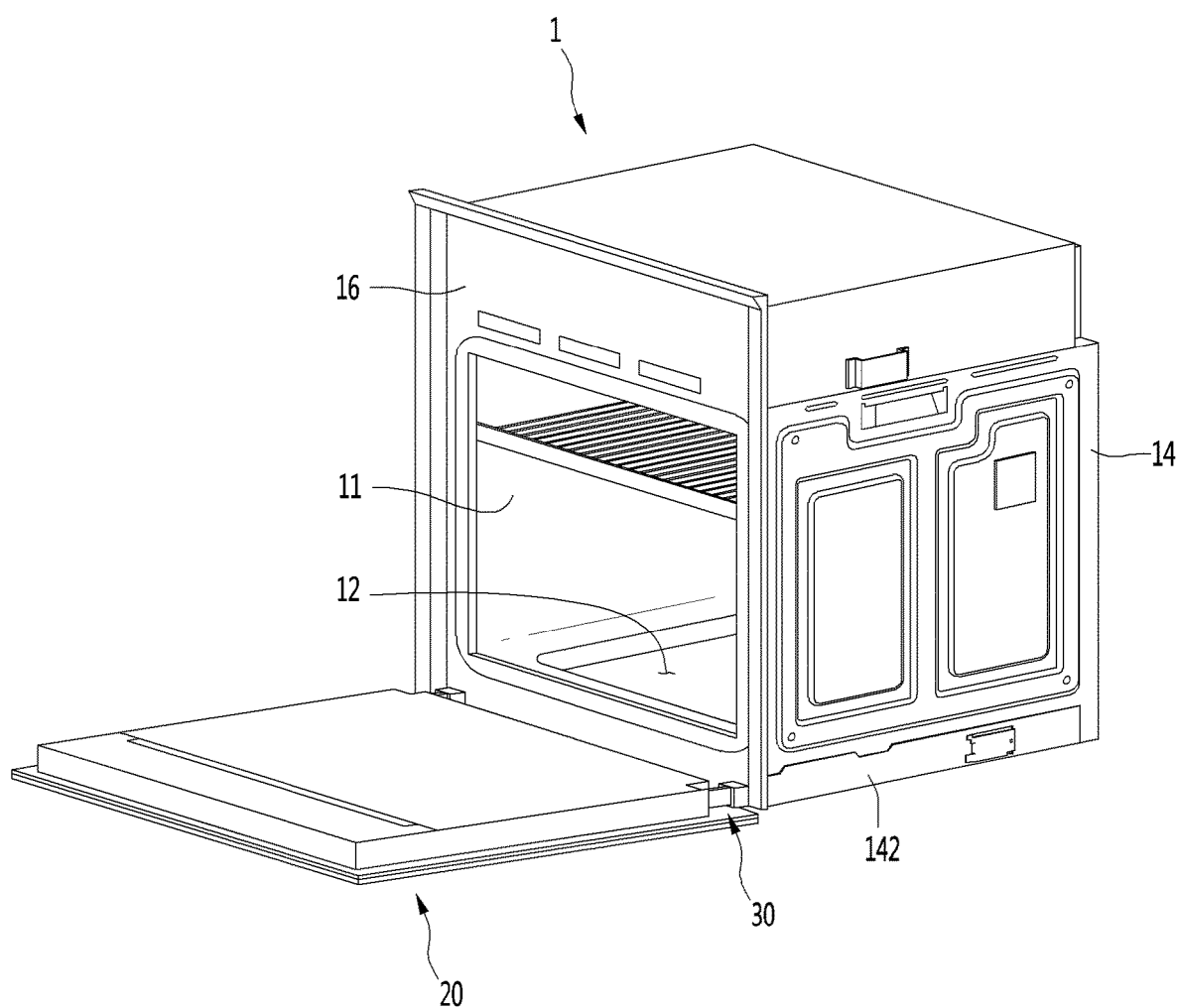
FIG. 2 is a perspective view showing a state in which a door is opened in the cooking appliance of FIG. 1.
Figure 3:
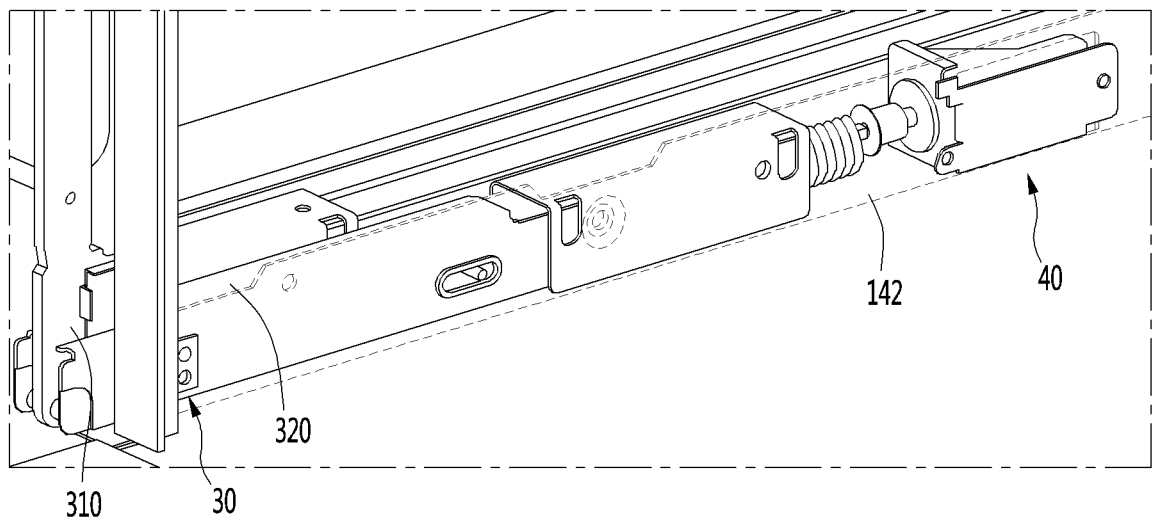
FIGS. 3 and 4 are views showing a state where a hinge mechanism and a sensor module according to an embodiment of the present invention are installed in a body.
Figure 4:
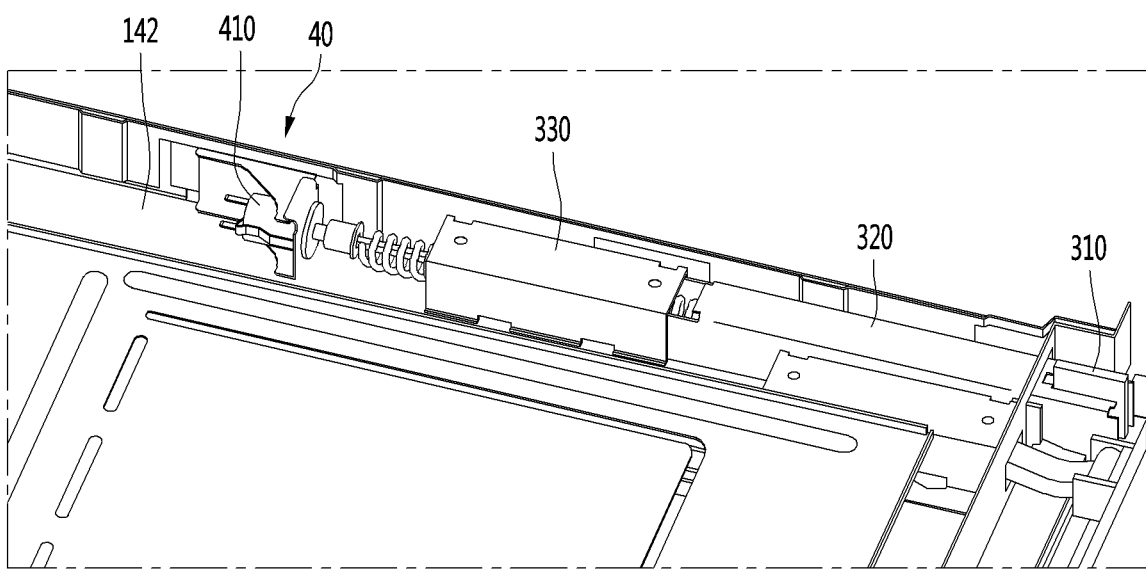
Figure 5:
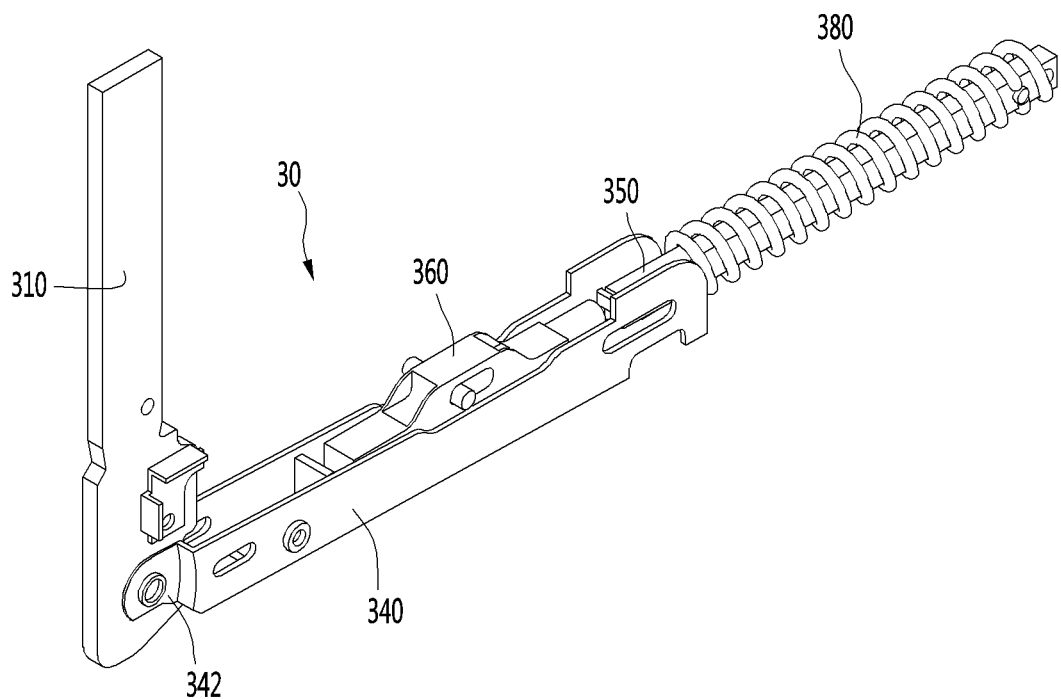
FIG. 5 is a perspective view showing a partial configuration of the hinge mechanism.

FIG. 1 is a perspective view of a cooking appliance according to an embodiment of the present invention, FIG. 2 is a view showing a state in which a door is opened in the cooking appliance of FIG. 1, FIGS. 3 and 4 are views showing a state where a hinge mechanism and a sensor module according to an embodiment of the present invention are installed in a body, and FIG. 5 is a perspective view showing a partial configuration of the hinge mechanism.

Referring to FIGS. 1 to 5, a cooking appliance 1 according to an embodiment of the present invention may include a body 10 having a heat source therein.

The body 10 may include an inner frame 11 and an outer frame 14 surrounding the inner frame 11 on the outer side of the inner frame 11.

In the present embodiment, when the cooking appliance 1 is installed as a built-in type, an outer frame 14 may form an outer appearance.

On the other hand, in the case where the cooking device 1 is installed and used independently in the kitchen, an outer case (not shown) may be additionally provided outside the outer frame 14.

A body panel 16 may be provided in a front end of the inner frame 11. The body panel 16 may be connected to or may be formed integrally with the front end of the inner frame 11.

The door 20 may be rotatably connected to the body 10 by a hinge mechanism 450. As an example, the hinge mechanism 450 may be connected to the lower end of the door 20.

The body 10 may further include a sensor module 40 including a sensor 410 for detecting whether the door 20 is opened or closed.

The sensor 410 may sense whether the door 20 is opened or closed because the hinge mechanism 30 selectively comes into contact with the sensor 410 according to the opening and closing of the door 20.

The sensor module 40 may be inserted into the body 10 through the one sidewall of the body 10 or may be withdrawn from the body 10.

The body 10 may further include a base 142 forming a bottom. The hinge mechanism 30 connected to the door 20 may be installed in the base 142.

The sensor module 40 may be detachably installed in the base 142. As an example, the sensor module 40 may be detachably connected to a lateral wall of the base 142.

As another example, it is also possible that the outer frame 14 includes a lateral wall, and the sensor module 40 is detachably installed in the lateral wall. The sensor module 40 may selectively come into contact with the hinge mechanism 30 according to opening and closing of the door 20 even though the sensor module 40 is installed on the lateral wall.

In the present embodiment, the lateral wall of the base 142 or the lateral wall of the outer frame 14 is referred to as a lateral wall of the body.

The hinge mechanism 30 will be schematically described.

The hinge mechanism 30 may include a hinge body 310 connected to the door 20. The hinge body 310 may be inserted into and fixed to a frame within the door 20, for example.

Accordingly, the door 20 may be rotated together with the hinge body 310.

The hinge body 310 may be rotatably connected to the hinge frame 320.

The hinge frame 320 may be installed in the base 142, for example. A portion of the hinge frame 320 may protrude forward of the body 10 by passing through the base 142 for connection with the door 20.

The hinge body 310 may be rotatably connected to a portion of the hinge frame 320 protruding forward of the body 10.

The hinge mechanism 30 may further include a plurality of links. When the hinge body 310 rotates together with the door 20, the plurality of links may cause forward and backward displacement to selectively come into contact with the sensor module 40.

The plurality of links may include a first link 340 rotatably connected to the hinge body 310 and a second link 350 movably connected to the first link 340.

The second link 350 may selectively come into contact with the sensor module 40.

Although not limited thereto, the first link 340 may extend in the front-rear direction in the base 142 and the hinge body 310 is connected to the front side of the first link 340 and the second link 350 is connected to the rear side of the first link 340.

The hinge mechanism 30 may further include a protection frame 330 fixed to the base 142 and surrounding the second link 350.

The hinge mechanism 30 includes a support frame 360 connected to the hinge frame 320 and accommodating a first elastic member (not shown) for providing an elastic force to the first link 340, and a second elastic member 380 provided to surround the outer side of the second link 350.

When the door 20 is opened, the door 20 is kept open by the first elastic member and the second elastic member 380. When the door 20 is closed, an elastic force may be provided in a direction in which the door 20 is closed.

Figure 6:
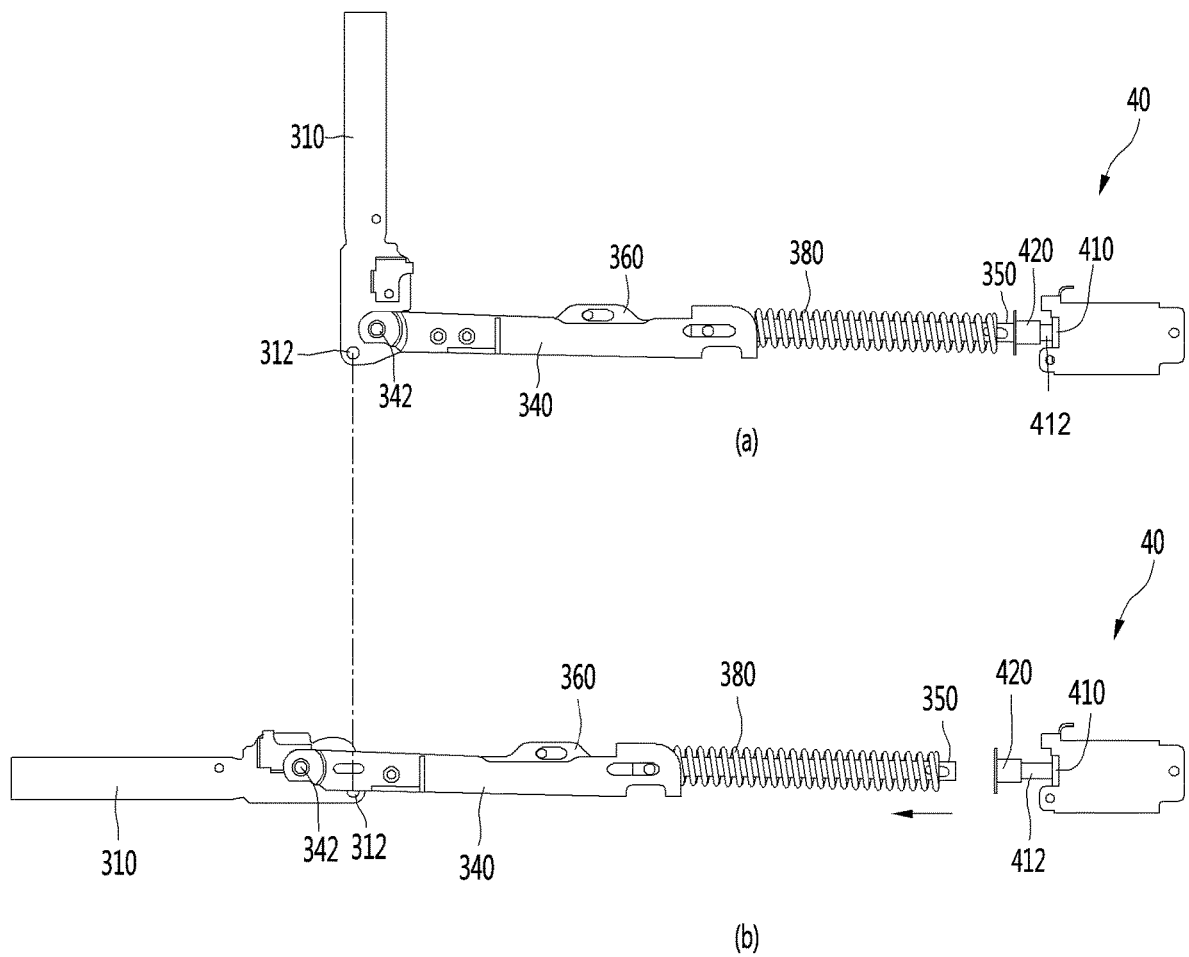
FIG. 6 is a view showing relationship between a hinge mechanism and a sensor module.
Figure 7:
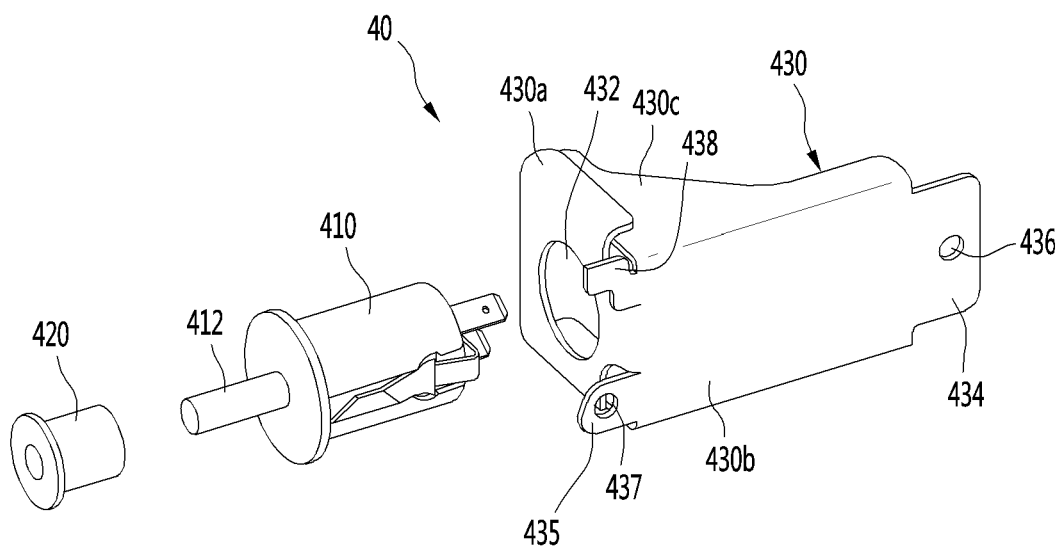
FIG. 7 is an exploded perspective view of a sensor module according to an embodiment of the present invention.
Figure 8:
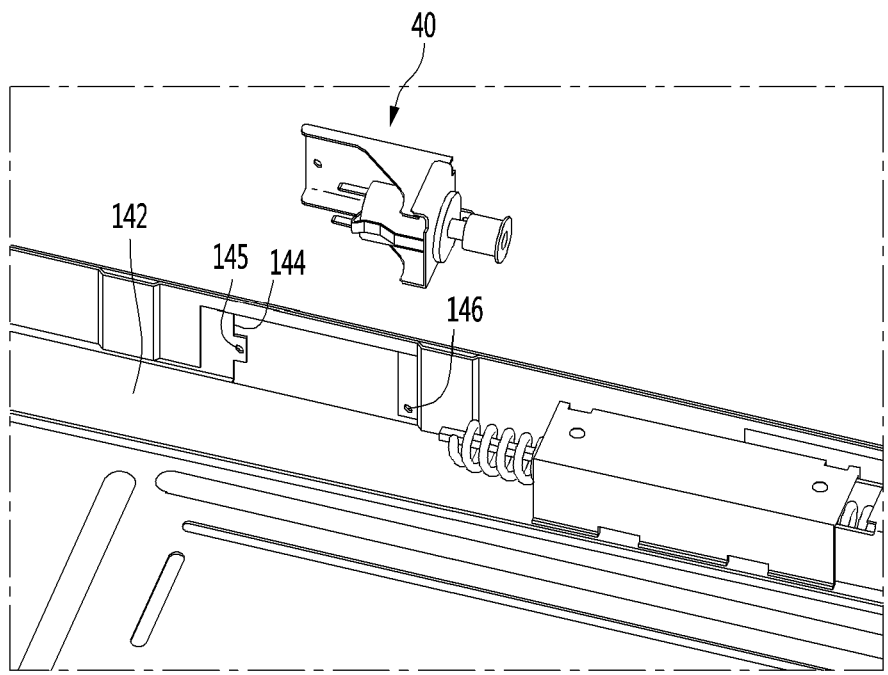
FIGS. 8 and 9 are perspective views showing a state in which the sensor module is detached from the body.
Figure 9:
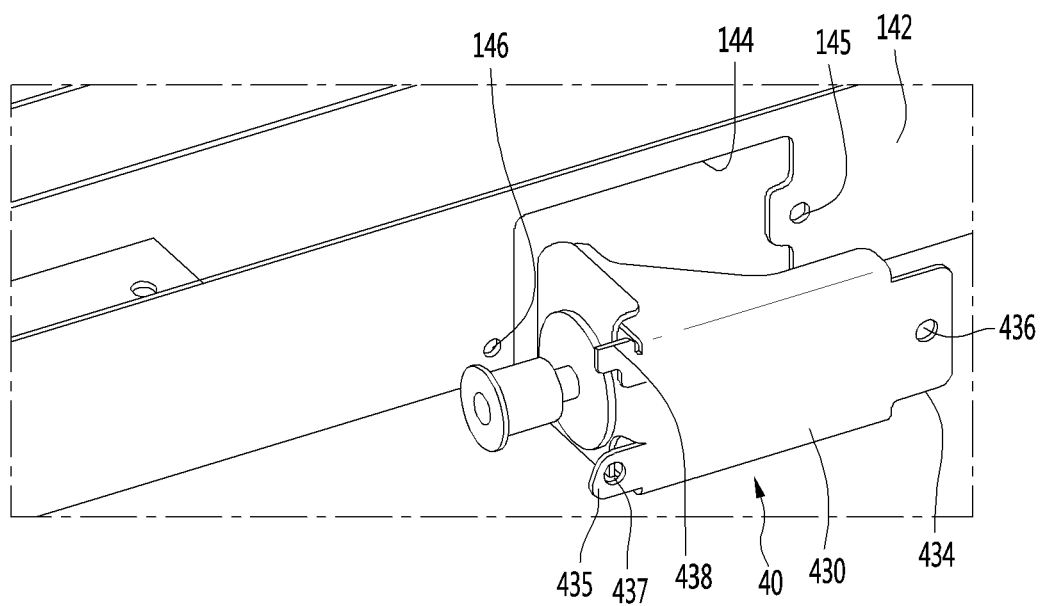

FIG. 6 is a view showing relationship between a hinge mechanism and a sensor module. FIG. 7 is an exploded perspective view of a sensor module according to an embodiment of the present invention, and FIGS. 8 and 9 are perspective views showing a state in which a sensor module is detached from a body.

In the FIG. 6, (a) is a view showing relationship between a hinge mechanism and a sensor module in a state in which a door is closed, and (b) is a view showing relationship between a hinge mechanism and a sensor module in a state in which a door is opened.

Referring to FIGS. 6 to 9, the sensor module 40 may be disposed at the rear side of the hinge mechanism 30 in the body 10. In the present embodiment, the front of the hinge mechanism 30 is a direction in which the door 20 is disposed. As an example, the sensor module 40 may be positioned at the rear side of the second link 350.

The hinge body 310 is connected to the hinge frame 320 by a first hinge 312 and the first link 340 is rotatably connected to the hinge body 310 by a second hinge 342 so as for the plurality of links 340 to have forward and backward displacement.

The second hinge 342 is spaced apart from the first hinge 312. In this case, the second hinge 342 are disposed behind rather than the first hinge 312 and be disposed higher than the first hinge 312 in a state in which the door 20 is closed such that the first link 340 advances in a process of opening the door 20 and the door 20 is retracted in a process of closing the door 20.

Therefore, as (a) of FIG. 6, when the door 20 is closed, the first link 340 is retracted, so that the second link 350 is also retracted and therefore, the second link 350 is in contact with the sensor module 40. In this state, a controller (not shown) recognizes that the door 20 is closed.

On the other hand, as (b) of FIG. 6, when the door 20 is opened, the second hinge 342 advances during the rotation of the hinge body 310 and the first link 340 is also caused to advance. As the first link 340 advances, the second link 350 is caused to advance together and the second link 350 is spaced from the sensor module 40.

In this state, the control unit (not shown) recognizes that the door 20 is in the opened state.

The sensor module 40 may include a sensor bracket 430 which is detachably installed in the body 10 in order to be detachably coupled to the body 10 (for example, the base 142) and the sensor 410 may be installed in the sensor bracket 430.

The sensor 410 may include a cylindrical body, and an operation bar 412 movably connected to the body and protruding outwardly of the body.

The body is fixed to the sensor bracket 430 and in a state where the body is fixed and no external force is applied to the operation bar 412, the operation bar 412 is caused to maximally protrude outwardly of the body by a spring within the body.

When the external force is applied to the operation bar 412, the operation bar 412 moves inwardly of the body.

In the present embodiment, whether the door 20 is opened or closed may be determined according to the movement position of the operation bar 412.

The operation bar 412 may be pressed by the second link 350 when the door 20 is closed.

The hinge mechanism 30 may be formed of a metal material so as to secure strength. On the other hand, the actuating bar 412 can be a plastic injection mold for reasons of operation smoothness, reduced manufacturing cost, and the like.

On the other hand, when the second link 350 directly come into contact with the operation bar 412, the contact portion of the operation bar 412 is worn and the operating performance of the sensor 410 is lowered when the amount of wear has increased.

Therefore, the operation bar 412 may be coupled with a cover 420 made of silicone or rubber. For example, the end of the operation bar 412 may be fitted and connected to the cover 420, and the cover 420 may prevent the operation bar 412 from being worn.

At least the sensor 410 may be inserted into the inside of the body 10 in a state where the sensor 410 is installed in the sensor bracket 430.

To this end, the base 142 may be provided with a module opening 144 into which a portion of the sensor module 40 is inserted.

Thus, the sensor 410 may be inserted into the body 10 from the sensor module 40 through the module opening 144 of the base 142.

The sensor bracket 430 may include an installation opening 432 through which the sensor 410 is installed.

The sensor bracket 430 may include a first bracket 430*a* and a second bracket 430*b* extending in a direction intersecting the first bracket 430*a*.

The installation opening 432 may be formed in the first bracket 430*a*.

The sensor bracket 430 may further include a third bracket 430*c* bent from the second bracket 430*b*.

The third bracket 430*c* is positioned behind the first bracket 430*a* and crosses the first bracket 430*a*. As an example, the third bracket 430*c* may restrict the first bracket 430*c* from being bent backward. As an example, a plurality of third brackets 430*c* may be spaced apart from one another in the vertical direction, and the sensor may be positioned between the plurality of third brackets 430*c*.

Of course, the third bracket 430*c* may be omitted.

One or more connection portions that connects the sensor module 40 to the base 142 may be included.

The sensor bracket 430 may include a plurality of connection portions such that the sensor module 40 is stably connected to the base 142.

As an example, the plurality of connection portions may include a first connection portion 434 and a second connection portion 435.

The first connection portion 434 is disposed on the rear side of the sensor bracket 435 as an example and the second connection portion 435 is disposed on the front side of the sensor bracket 430 as an example.

That is, the first and second connection portions 434 and 435 may be spaced apart from each other in the front-rear direction with reference to the cooking appliance 1.

Alternatively, the first connection portion 434 and the second connection portion 435 may be spaced apart from each other in the vertical direction. In the present embodiment, there is no limitation on the arrangement of the plurality of connection portions.

The plurality of connection portions may be formed in the second bracket 430*b*.

The plurality of connection portions may be spaced apart from each other in the extending direction of the second bracket 430*b*.

In the present embodiment, a portion of the sensor module 40 is positioned inside the body 10 and the other portion of the sensor module 40 is positioned outside the body 10, which allows a user to easily take the sensor module 40 out of the body 10.

Therefore, in the present embodiment, at least the plurality of connection portions of the sensor brackets 430 are disposed outside the body 10 without being inserted into the body 10.

The portions of the sensor 410 and the sensor bracket 430 are inserted into the inside of the body 10 through the module opening 144 when the sensor module 40 is installed.

As an example, the first bracket 430*a* and the third bracket 430*c* pass through the module opening 144 and are inserted into the inside of the body 10. On the other hand, the second bracket 430*b* covers the module opening 144 on the outside of the main body 10.

The connection portions 434 and 435 come into contact with the base 142 outside the body 10.

When the connection portions 434 and 435 come into contact with the base 142, the insertion of the sensor module 40 is restricted.

The connections portions 434 and 435 only serve to connect the sensor bracket 430 to the base 142 but also, in a state where a portion of the sensor module 40 is inserted into the inside of the body 10, serve as stoppers to restrict further insertion.

Fastening holes 436 and 437 to which screws are fastened may be formed in the first and second connection portions 434 and 435, respectively.

In addition, fastening holes 145 and 146 to which screws are fastened may be formed in a portion of the base 142 where the first connection portion 434 and the second connection portion 435 contact each other.

The sensor bracket 430 may further include a reinforcing rib 438 that prevents the sensor bracket 430 from being deformed by an external force in a state where the sensor module 40 is installed on the base 142.

The reinforcing rib 438 may come into contact with the base 142 outside the body 10 in the course of the sensor module 40 being inserted into the inside of the body 10.

Since the first and second connection portions 434 and 435 are spaced apart from each other, when an external force is applied to the sensor bracket 430, it is apprehended that portions in which the connection portions 434 and 435 are formed is deformed.

In this case, the sensor module 40 is further inserted into the inside of the body 10, and thus there may be caused a problem that the second link 350 and the cover 420 (or the operation bar 412) are not be aligned.

However, in the present embodiment, since the sensor bracket 430 further includes the reinforcing ribs 438, resistance to prevent the sensor module 40 from being inserted into the body 10 increases. As a result, the sensor bracket 430 may be prevented from being deformed, and the sensor module 40 may be prevented from being further inserted into the inside of the body 10.

In the present embodiment, the second link 340 is spaced from the cover 420 in the state in which the door 20 is opened.

Therefore, in the state in which the door 20 is opened, the sensor module 40 may be separated from the body 10 or the sensor module 40 may be mounted to the body 10.

According to the present invention, the sensor module is detachably mounted on the side surface of the body, thereby preventing the sensor module from being exposed to the outside in front of the cooking appliance, regardless of the opening and closing of the door.

According to the present invention, the other portion of the sensor module is positioned outside the body in a state in which a portion of the sensor module is inserted into the body, thereby allowing the sensor module to be detached from the body easily in a state in which the sensor module is disconnected from the body.

What is claimed is:

1. A cooking appliance comprising:
   a body that defines a cooking chamber;
   a door connected to the body and configured to open and close the cooking chamber;
   a hinge mechanism that connects the door to the body; and
   a sensor module that is configured to be inserted into the body through a wall of the body and that is configured to, based on closing and opening of the door, come into contact with or be spaced apart from, respectively, the hinge mechanism,
   wherein the sensor module comprises a sensor and a sensor bracket, the sensor bracket being configured to seat the sensor and to be inserted through the wall of the body,
   wherein the wall of the body defines a module opening that is configured to receive the sensor module,
   wherein the sensor bracket comprises:
      an insertion portion at which the sensor is installed, the insertion portion being configured to be inserted into the body through the module opening, and
      at least one connection portion configured to connect to the wall of the body, and
   wherein the at least one connection portion is configured to, based on the insertion portion of the sensor bracket being inserted into the body through the module opening, contact the wall of the body at an outside portion of the body.

2. The cooking appliance of claim 1, wherein the wall of the body is a lateral wall of the body.

3. The cooking appliance of claim 1,
   wherein the sensor module comprises a first portion that is inserted into the body through the module opening, and a second portion that contacts the wall of the body at the outside portion of the body.

4. The cooking appliance of claim 1, wherein the sensor bracket comprises:
   a first bracket that extends in a first direction, that defines an installation opening configured to receive the sensor, and that is configured to be inserted into the body through the module opening; and
   a second bracket that extends in a second direction intersecting the first direction and that covers the module opening at the outside portion of the body.

5. The cooking appliance of claim 4, wherein the at least one connection portion is disposed at the second bracket.

6. The cooking appliance of claim 5, wherein the at least one connection portion comprises a first connection portion, and a second connection that is spaced apart from the first connection portion in the second direction.

7. The cooking appliance of claim 4, wherein the sensor bracket further comprises a third bracket that extends from the second bracket in a direction intersecting the second bracket, the third bracket being disposed rearward of the first bracket.

8. The cooking appliance of claim 7, wherein the third bracket comprises a plurality of third brackets that are spaced apart from each other, and
   wherein the sensor is disposed between the plurality of third brackets.

9. The cooking appliance of claim 1, wherein the at least one connection portion defines a bracket fastening hole configured to receive a screw, and
   wherein the wall of the body defines a wall fastening hole that is configured to, based on the sensor module being installed at the wall, face the bracket fastening hole and receive the screw through the bracket fastening hole.

10. The cooking appliance of claim 1, wherein the sensor bracket further comprises a reinforcing rib that is configured to contact an outside of the wall based on the insertion portion being inserted into the body through the module opening.

11. The cooking appliance of claim 1, wherein the sensor comprises:
    a sensor body; and
    an operation bar that is disposed in the sensor body, that is configured to move relative to the sensor body, and that protrudes outward of the sensor body, and
    wherein the operation bar is configured to, based on the door being closed, receive a pressing force from the hinge mechanism.

12. The cooking appliance of claim 11, further comprising:
    a cover that is made of silicone or rubber, that is connected to the operation bar, and that blocks direct contact between the hinge mechanism and the operation bar.

13. The cooking appliance of claim 1, wherein the body comprises a base at which the hinge mechanism is installed, and
    wherein the module opening is defined at the base of the body.

14. The cooking appliance of claim 1, wherein the allows the sensor module to be inserted into the body or withdrawn from the body.

15. The cooking appliance of claim 14, wherein at least a portion of the sensor module is disposed outside of the wall of the body.

16. A sensor module for a cooking appliance that includes a body that defines a cooking chamber and a door that is connected to the body through a hinge mechanism and that is configured to open and close the cooking chamber, the sensor module comprising:
    a sensor that is configured to be provided within the body through a wall of the body and that is configured to, based on closing and opening of the door, come into contact with or be spaced apart from the hinge mechanism, respectively; and
    a sensor bracket that is configured to seat the sensor and to be inserted through the wall of the cooking appliance,
    wherein at least a portion of the sensor bracket is configured to be disposed outside of the wall of the body in a state in which the sensor is disposed within the body.

17. The sensor module of claim 16, wherein the sensor bracket is configured to be inserted into the body or withdrawn from the body through a module opening that is defined at the wall of the body.

18. The sensor module of claim 17, wherein the sensor bracket comprises:
    a first bracket that extends toward the cooking chamber, that defines an installation opening configured to receive the sensor, and that is configured to be inserted into the body through the module opening; and
    a second bracket that extends rearward or forward from the first bracket and that is configured to cover the module opening from an outside portion of the body.

19. The sensor module of claim 16, wherein the sensor comprises:
    a sensor body coupled to the sensor bracket; and an operation bar that is disposed in the sensor body, that protrudes outward of the sensor body, and that is configured to move relative to the sensor body, and wherein the operation bar is configured to, based on the door being closed, receive a pressing force from the hinge mechanism and be inserted toward the sensor body.

\* \* \* \* \*